United States Patent [19]
Becher et al.

[11] Patent Number: 5,517,091
[45] Date of Patent: *May 14, 1996

[54] MODULAR ELECTRICAL SYSTEM FOR DEVICE UNITS

[75] Inventors: Mark Becher, Greer; Kenneth R. Charron, Liberty, both of S.C.

[73] Assignee: Charron Sports Services, Inc., Liberty, S.C.

[ * ] Notice: The term of this patent shall not extend beyond the expiration date of Pat. No. 5,374,878.

[21] Appl. No.: 335,320

[22] Filed: Nov. 7, 1994

Related U.S. Application Data

[63] Continuation of Ser. No. 109,332, Aug. 18, 1993, Pat. No. 5,374,878.

[51] Int. Cl.⁶ ........................................... H02P 7/67
[52] U.S. Cl. ................. 318/49; 318/65; 318/103; 318/466; 52/10; 200/51.02; 200/51.09; 200/238
[58] Field of Search ................. 318/37, 40–41, 318/49–50, 65, 66, 82, 98, 101, 103, 111–113, 67–78, 466–470, 34–35; 200/51 R, 51.02, 51.04, 51.07, 51.09, 61.39, 47, 43.02, 43.04, 43.05, 43.06, 237–238, 243, 275, 280–281, DIG. 24; 52/6–10

[56] References Cited

U.S. PATENT DOCUMENTS

| 3,045,292 | 7/1962 | Murphy . | |
|---|---|---|---|
| 3,052,929 | 9/1962 | Busse . | |
| 3,469,354 | 9/1969 | Meetze . | |
| 3,881,140 | 4/1975 | Hartman | 318/85 |
| 4,285,172 | 8/1981 | Quigley | 52/10 |
| 5,374,878 | 12/1994 | Becher et al. | 318/49 |

*Primary Examiner*—David S. Martin
*Attorney, Agent, or Firm*—Hardaway Law Firm

[57] ABSTRACT

A modular electrical system (10) supplies power to and controls a plurality of electric motors ($M_1$, $M_2$, $M_3$, $M_4$) associated with a plurality of drive units folding or extending rows in a telescopic seating system, comprising the motors ($M_1$, $M_2$, $M_3$, $M_4$), a control panel (12) removably communicating with the motors ($M_1$, $M_2$, $M_3$, $M_4$) directing incoming current to drive the motors ($M_1$, $M_2$, $M_3$, $M_4$) in a predetermined direction, a dual receptacle (18) communicating with the control panel (12), and a switch (26) terminating in a plug (30) removably communicating with the dual receptacle (18).

2 Claims, 3 Drawing Sheets

MODULAR ELECTRICAL SYSTEM FOR DEVICE UNITS

This application is a continuation of application Ser. No. 08/109,332, filed Aug. 18, 1993 U.S. Pat. No. 5,374,878.

BACKGROUND OF THE INVENTION

This invention relates to an electrical system for transmitting power to a plurality of drive units which fold or extend rows of seats or benches arranged in a telescopic seating system.

Various devices are known in the art for extending or retracting bleachers, such as may be found in an indoor athletic facility. U.S. Pat. No. 4,285,172 to Quigley teaches a powered drive apparatus which folds and unfolds rows of bleachers and which is adapted to fit almost entirely beneath a deck of the lowermost row. However, no electrical system for driving more than one apparatus at a time is disclosed. U.S. Pat. No. 3,052,929 to Busse discloses a power actuated bleacher assemblage and suggests using multiple motor units which are simultaneously operated by a single reversing switch; however, the connections between the switch and the units are not specified.

Typically, components of a motor driven bleacher assemblage, tested individually but not as a system, are shipped to the installation site, requiring personnel to both erect the structure of the bleachers and to perform all wiring associated with connections to the motor units. This often requires installation personnel to manually strip ends of wires and establish electrical connections according to a set of instructions. This has proven time consuming, resulting in significant costs borne by the owner of the installation site. Furthermore, such an owner must rely on the expertise of the installation personnel, who may not be a registered electrician, thereby raising a question as to whether quality of the electrical connections may be assured. Moreover, lack of testing components of the motor driven units of the bleacher assemblage as a system presents the risk that the components, although tested and approved individually, may not perform as desired when comprising a part of an overall system.

SUMMARY OF THE INVENTION

It is an important object of the present invention to provide a modular electrical system having power drive unit components which are assembled and tested as a system before shipment to an installation site.

It is a further object of the present invention to provide a modular electrical system in which power drive units, a control panel, and a power source are all interconnected through plug-in type connections, thereby relieving installation personnel of all wiring work.

It is a further object of the present invention to provide a modular electrical system which allows for installation to a wide variety of bleacher configurations using only a limited number of standard components.

It is a further object of the present invention to provide a modular electrical system which can utilize two or more control panels.

It is a further object of the present invention to provide a modular electrical system which allows for simple and reliable means for changing the direction of travel of drive units to fold or extend rows in a telescopic seating system.

These as well as other objects are accomplished by a modular electrical system for supplying power to a plurality of drive units designed to fold or extend rows in a telescopic seating system having a plurality of electric motors driving the drive units, a control panel removably communicating with the motors directing incoming current to drive the motors in a predetermined direction, a dual receptacle communicating with said the control panel, and a switch terminating in a plug removably communicating with the dual receptacle. Thus, a user may actuate the switch to drive the drive units together in a particular direction.

DETAILED DESCRIPTION

In accordance with this invention, it has been found that a modular electrical system may be provided which is simple to install and wherein a user may simultaneously control a plurality of drive units with a single control panel.

Figure 1:
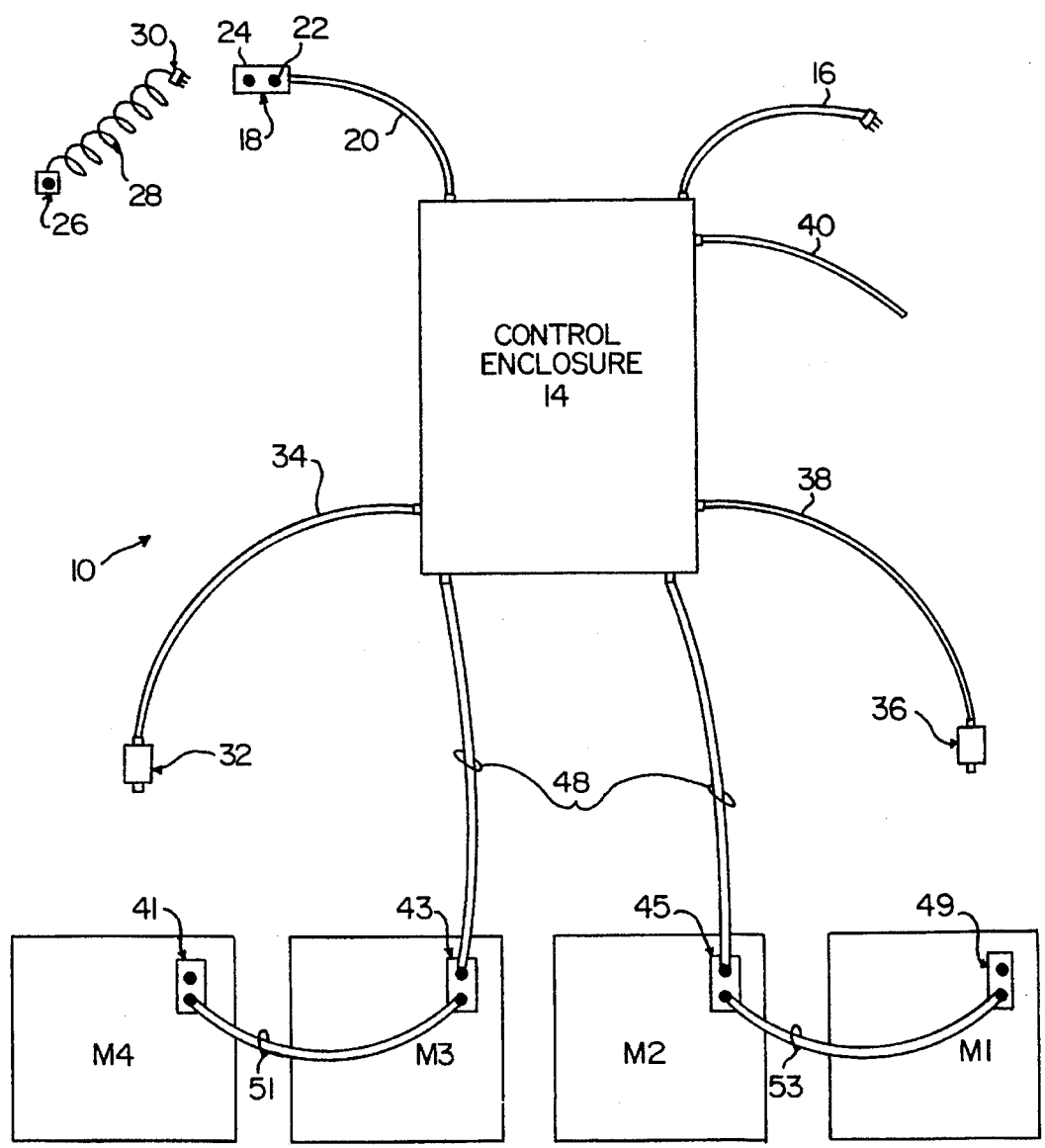
FIG. 1 is a schematic view of the principal components of a modular electrical system constructed in accordance with a preferred embodiment of the present invention.

Referring to FIG. 1, the modular electrical system 10 generally includes a control panel 12 (FIG. 2) housed in a control enclosure 14. The system 10 is designed to supply power to and control movement of a plurality of motors associated with drive units extending or folding a telescopic seating system. Although no drive units are shown herein, a drive unit to be used in system 10 is described fully in copending application Ser. No. 08/109,151, filed Aug. 18,1993, the disclosure of which is hereby incorporated by reference. The control panel 12 communicates through leads 48 (FIG. 2) protruding from at its lower end to a plurality of drive unit electric motors $M_1$, $M_2$, $M_3$, $M_4$ at upper sockets of respective receptacles 41, 43, 45, and 49, and transmits power thereto supplied by power source wire 16. A dual receptacle 18 communicates with the control panel 12 through wire 20 and is provided with an extend socket 22 and a fold socket 24. A switch 26 connected by wire 28 to a plug 30 removably communicates with dual receptacle 18 through plug 30 at either extend socket 22 or fold socket 24. Switch 26 activates the control panel 12 to cause the drive units to move in unison to either fold or extend a telescopic seating system, as will be more fully described herein. Motors $M_4$ and $M_3$ are interconnected by a lead 51 plugged into lower sockets of receptacles 41 and 43, while motors $M_2$ and $M_1$ are similarly interconnected by a lead 53 at lower sockets of receptacles 45 and 49.

The system 10 may be further provided with an extend limit switch 32 communicating with control panel 12 through wire 34 which terminates power to the control panel 12 when the plurality of drive units have fully extended the telescopic seating system. The extend limit switch 32 is mechanically actuated by the bleachers and is placed in the vicinity of the highest bleacher row. Similarly, a fold limit switch 36 communicating with the control panel 12 through a wire 38 may be provided to terminate power to the control panel when the plurality of drive units have fully folded the telescopic seating system.

A wire 40 may lead from the control panel 12 for connection to a satellite panel (not shown) having identical structure to the control panel 12 and communicating with electric motors of additional drive units. Through connections to be more fully described, the control panel controls the motors of these additional drive units, as well as motors $M_1$–$M_4$.

Figure 2:
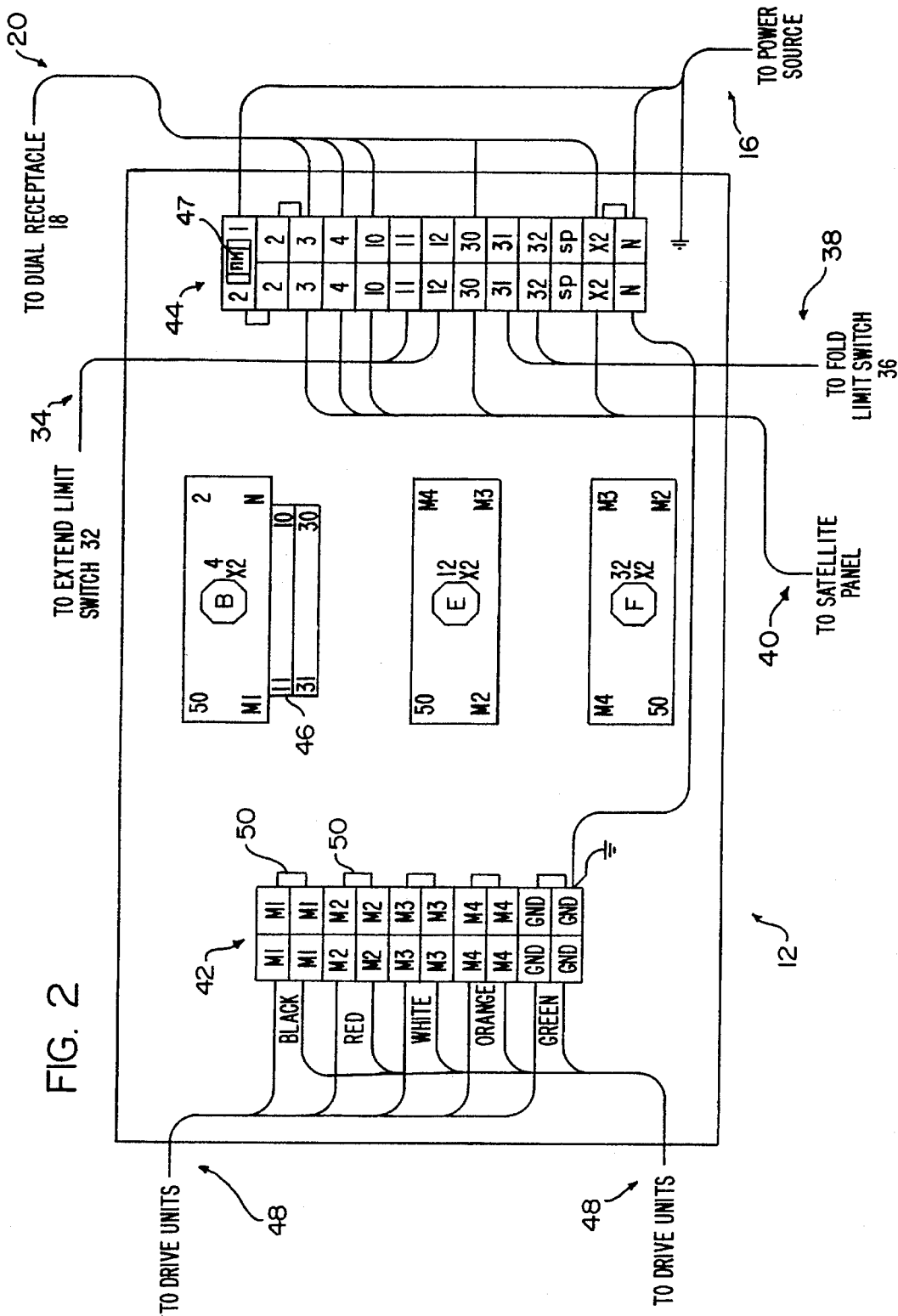
FIG. 2 is a schematic view of an exposed control panel.

Referring to FIG. 2, an exposed control panel 12 is shown having a first terminal block generally indicated at 42, a second terminal block generally indicated at 44, a fold relay F, an extend relay E, and a power blocking relay B. An auxiliary relay 46 disposed adjacent to the power blocking relay B energizes or deenergizes the remaining relays and thus the entire control panel 12. Additionally, a fuse block 47 may be included in part of the second terminal block 44.

As shown in FIG. 2, it may be desired to drive only two drive units. Accordingly, a plurality of wires are connected as shown at first terminal block 42 and lead out to the drive units through a pair of leads 48. In such an arrangement, jumpers such as those shown at 50 are attached to adjacent terminals in the first terminal block opposite the plurality of wires forming leads 48. Similarly, pluralities of wires connected to second terminal block 44 respectively form lead 20 communicating with dual receptacle 18, lead 16 to a power source, lead 38 communicating with fold limit switch 36, lead 34 communicating with extend limit switch 32, and a lead 40 communicating with a satellite panel when more than four drive units are to be used. Lead 40 would be connected to one of the terminals "sp" in the satellite panel. With the arrangement shown, one may drive two drive units with a single control panel 12.

Figure 3:
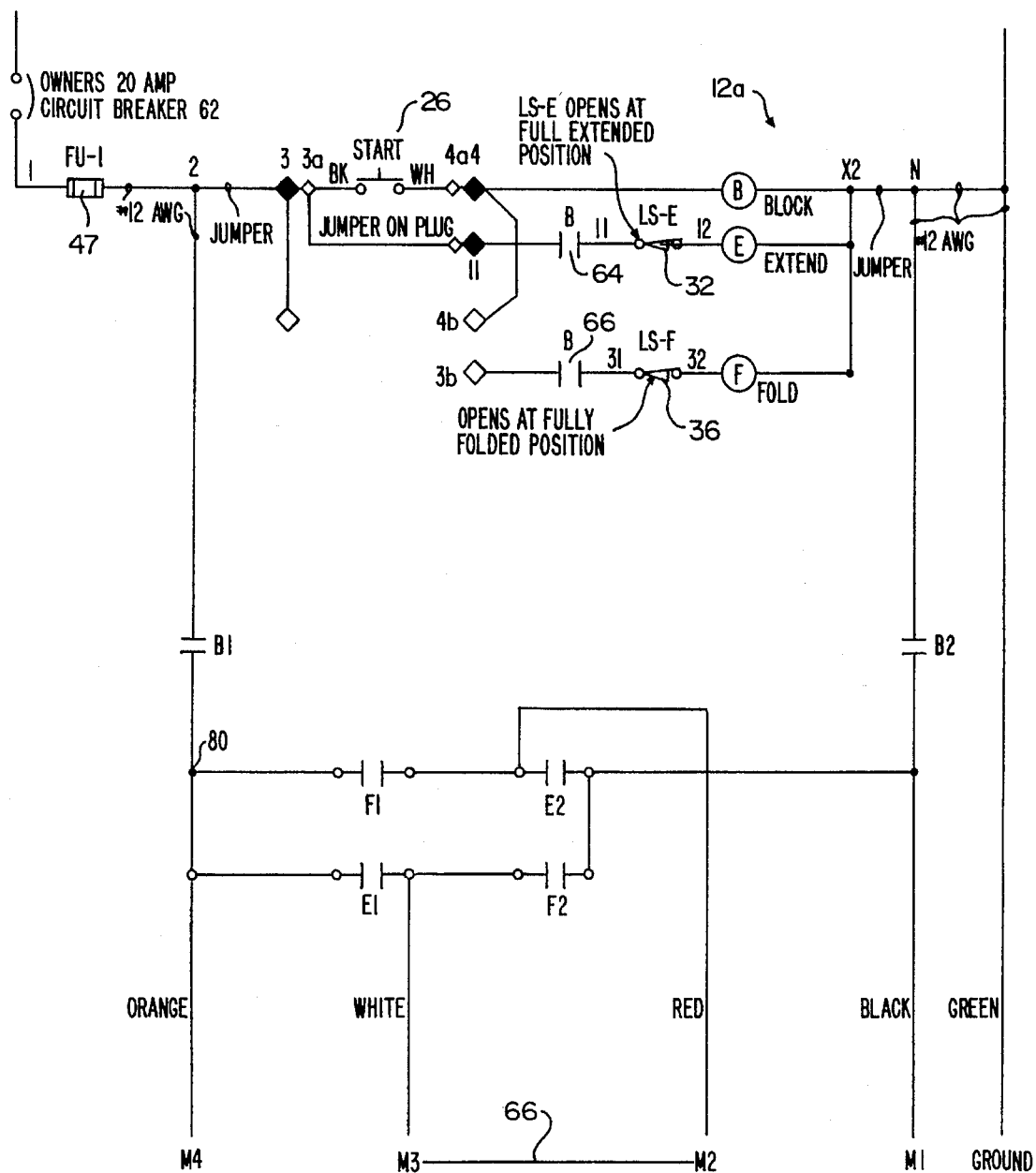
FIG. 3 is an elementary diagram of an electrical circuit for a control panel in the modular electrical system constructed in accordance with the preferred embodiment of the present invention.

Referring to FIG. 3, the electrical circuit 12a of the control panel 12 is broken as shown at circuit breaker 62, which when closed supplies the circuit 12a with a preferable amperage of 20 or 30 amps. The path of current through circuit 12a differs depending on whether plug 30 of switch 26 is plugged into extend socket 22 or fold socket 24 of dual receptacle 18 (FIG. 1).

If plug 30 is plugged into extend socket 22, current flows through circuit 12a to drive the plurality of motors in a direction such that said plurality of drive units move together to extend the telescopic seating system. When circuit breaker 62 and switch 26 are closed, current flows from node 1 through fuse 47 and proceeds across node 2 to first and second extend terminals 3 and 4, respectively, whereupon power is supplied to block power relay B, energizing extend relay E connected in parallel to block power relay B. This closes the normally-open contacts 64, $B_1$, and $B_2$, as well as extend contacts E1 and E2. Extend limit switch 32 being closed before full bleacher extension, current flows from extend relay E to third extend terminal 11. Current also flows from node 2 across the now-closed contact B1, where at node 80 it branches to both supply power to motor $M_4$ and to flow across the now-closed extend contact E1, supplying power to motor $M_3$. Since contact F2 is closed, the current then travels across a wire 66 to energize motor $M_2$, whereafter it travels up the "red" wire, across now-closed contact E2, and energizes motor $M_1$ via the "black" wire. Thus, the plurality of drive units operate to extend the telescopic seating system until the extend limit switch 32 is mechanically opened, terminating power to the circuit 12a.

If plug 30 is plugged into fold socket 24, current flows through circuit 12a to drive the plurality of motors in a direction such that the plurality of drive units move together to fold the telescopic seating system. When circuit breaker 62 and switch 26 are closed, current flows from node 1 through fuse 47 and proceeds across node 2 to first and second fold terminals 3a and 4a, energizing power blocking relay B and thus the circuit 12a. Contacts 64, 66, B1, and B1 thus again close. Assuming a predetermined condition is satisfied between third and fourth fold terminals 4b and 31, respectively, current then travels through these terminals to third rung of the circuit 12a across the now-closed contact 66 and fold limit switch 36, thereby energizing the fold relay F. This, in turn, closes contacts F1 and F2. Current travels from node 2 across now-closed contact B1, whereupon at node 80 it branches to both supply power to motor $M_4$ and to flow across the now-closed contact F1 (contact E1 being open). The current thus flows through the "red" line down to energize motor $M_2$, thence proceeding through wire 66 to energize motor $M_3$. The current then travels up the "white" line across now-closed contact F2, proceeding to the "black" line to energize motor $M_1$. Thus, the drive units all are driven rearwardly to fold the telescopic seating system until fold limit switch 36 is mechanically opened, terminating power to the circuit 12a.

Reversal of the motors $M_1$, $M_2$, $M_3$, $M_4$ is accomplished through changing the direction of the fields generated by the windings in the motors. Preferably, a ¼ hp, 120 V, split-phase electric motor is used for each motor $M_1$–$M_4$, such a motor being available under Model No. 5K934 from W. W. Grainger Co. of Chicago, Ill.

It is thus seen that a modular electrical system may be provided which eliminates the need for wiring by installation personnel by virtue of the several plug-together connections. Further, a wide variety of layouts may be used while still minimizing the number of standard parts, providing the system of the present invention with a modular concept.

As the above description is merely exemplary in nature, being merely illustrative of the invention, many variations will become apparent to those of skill in the art. Such variations, however, are included within the spirit and scope of this invention as defined by the following appended claims.

That which is claimed:

1. An electrical system for supplying power to a plurality of drive unit motors, comprising:

a control panel removably communicating with said plurality of drive unit motors directing incoming current to drive said plurality of drive unit motors, said control panel including a relay group comprising a block relay receiving current from a power source upon closing of a switch to energize said control panel, an extend relay directing current to flow in a first direction through said plurality of drive unit motors, and a fold relay directing current to flow through said plurality of drive unit motors in a second direction opposite said first direction;

a first terminal block disposed proximate a lower end of said control panel;

a second terminal block disposed proximate a top end of said control panel;

a satellite panel terminal located in said second terminal block; and a dual receptacle communicating with said second terminal block;

said switch terminating in a plug removably communicating with said dual receptacle;

said first terminal block, said relay group, and said second terminal block arranged in sequence from proximate said lower end of said control panel to proximate said top end of said control panel;

whereby a user may actuate said switch to drive said plurality of drive units together in a particular direction.

2. The system set forth in claim 1 further comprising a satellite panel lead running from said control panel.

* * * * *